UNITED STATES PATENT OFFICE.

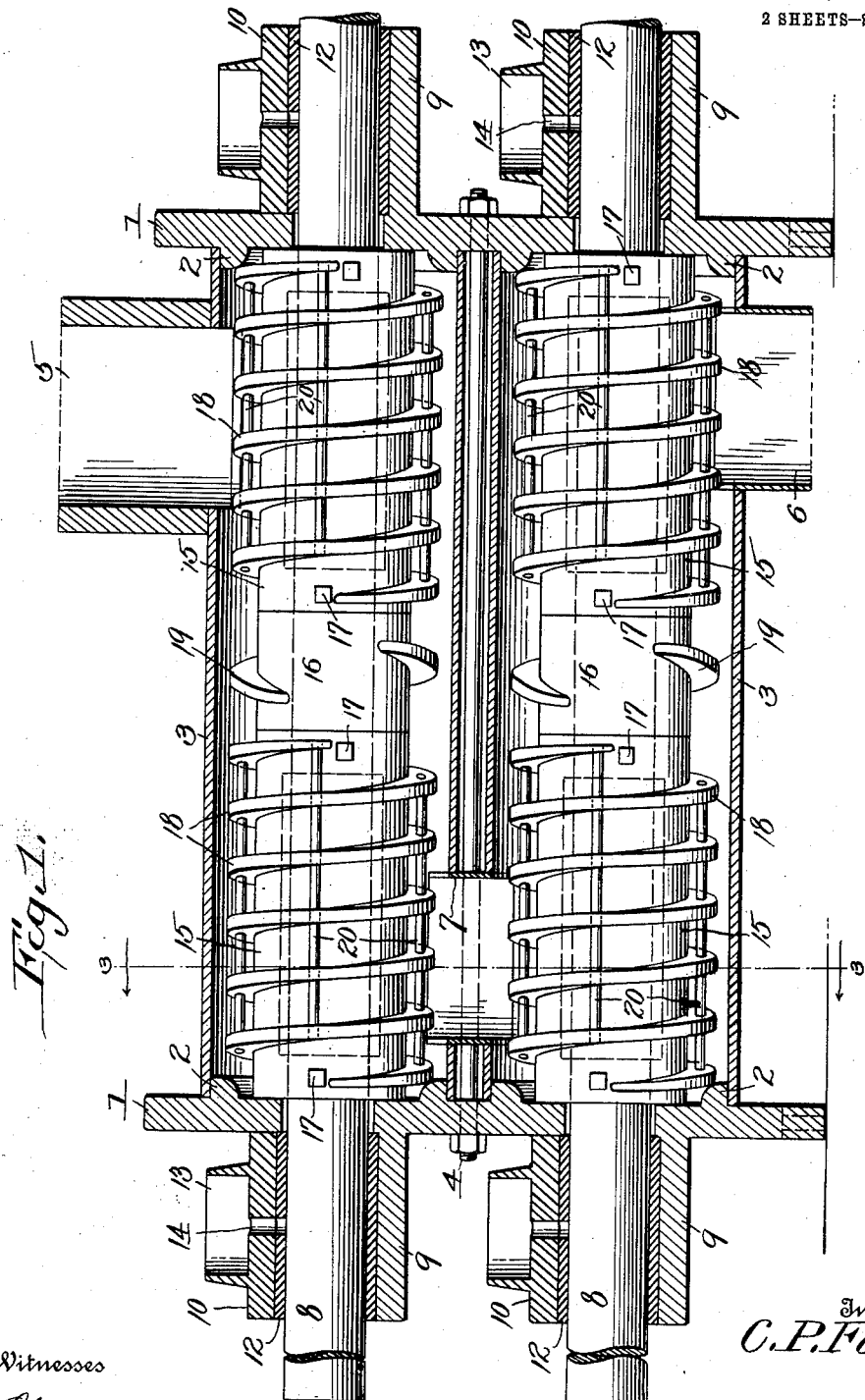

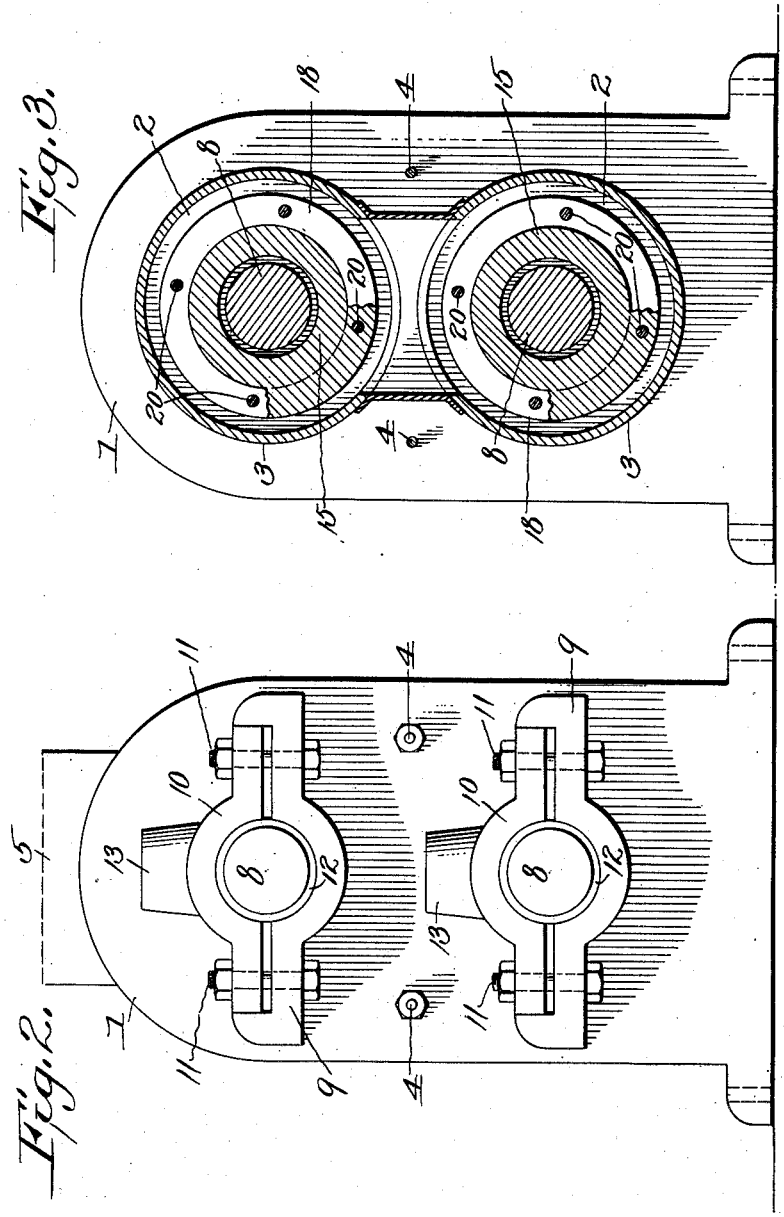

CHARLES P. FOX, OF DARETOWN, NEW JERSEY.

GRAIN TEMPERING AND POLISHING DEVICE.

998,335. Specification of Letters Patent. Patented July 18, 1911.

Application filed January 31, 1911. Serial No. 605,744.

*To all whom it may concern:*

Be it known that I, CHARLES P. FOX, citizen of the United States, residing at Daretown, in the county of Salem and State of New Jersey, have invented certain new and useful Improvements in Grain Tempering and Polishing Devices, of which the following is a specification.

The present invention relates to an improved machine for tempering and scouring grain and like products, and the object of the invention is the provision of a machine of this character which embodies novel features of construction whereby the grain is thoroughly agitated, and the berries caused to rub against each other during their passage through the machine in such a manner as to effectively take off the fine hairs and remove any foreign matter which may be adhering to the grain.

A further object of the invention is the provision of a grain tempering and scouring machine which is simple and inexpensive in its construction, which operates continuously upon the grain, and which comprises few and durable parts such as can be readily taken apart and assembled as may be desired.

With these and other objects in view, the invention consists in certain combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a longitudinal sectional view through a grain tempering and scouring machine constructed in accordance with the invention. Fig. 2 is an end view of the same, and Fig. 3 is a vertical transverse sectional view on the line 3—3 of Fig. 1.

Corresponding and like parts are referred to in the following description and indicated in all the views of the drawings by the same reference characters.

Specifically describing the embodiment of the invention illustrated upon the accompanying drawings, the numerals 1 designate a pair of end standards which are provided upon their opposing faces with the circular shoulders 2, the said shoulders being engaged by the ends of cylindrical casings 3. These cylindrical casings 3 are horizontally disposed and are held in position by means of the shoulders 2, the end standards 1 being connected by the tie-bolts 4 which hold the same securely against spreading. At one end of the machine the upper casing 3 is provided with a feed opening communicating with a chute or pipe 5 while the lower cylindrical casing is formed with a discharge opening communicating with a chute or pipe 6. At the opposite end of the machine the two casings 3 are connected by a passage 7, the grain being designed to enter the upper cylindrical casing through the feed opening and to pass longitudinally through the upper casing to the opposite end thereof where it drops through the passage 7 into the lower casing 3, after which it is moved through the lower casing and discharged through the pipe 6.

Extending longitudinally through each of the cylindrical casings 3 is a shaft 8, the said shafts extending through the standards 1 and being journaled in suitable bearings upon the outer faces thereof. Each of these bearings is shown as comprising a lower half 9 which is rigid with the end standard, and an upper half 10 which is removable and is held in position by the bolts 11. A sleeve 12 of some suitable anti-friction material may be applied to the shaft between the upper and lower sections of the bearing, and the upper bearing is shown as formed with an oil cup 13 and a feed opening 14 leading from the oil cup to the part to be lubricated. The shafts 8 may be rotated in any suitable manner and in the present instance are arranged to turn in opposite directions.

Fitted upon each of the shafts 8 within the respective casings 3 is a pair of hollow sleeves 15 and an intermediate collar 16, the said sleeves being clamped in position by the set screws 17 while the collar is held between the inner ends of the sleeves. Each of the sleeves 15 is provided with a spiral rib 18 which projects outwardly therefrom, all of the ribs 18 throughout the machine having the same direction of curvature. The collars 16 are formed with retarding flanges 19 which preferably only extend partially around the same and also have a spiral disposition, but have an opposite direction of curvature to the spiral ribs 18. Attention is also directed to the fact that the spiral ribs 18 are provided with a series of longitudinal rods 20 which are spaced from the sleeves and are shown as arranged parallel to each other and to the shaft 8.

In the operation of the machine the grain or other material to be scoured is fed through the feed pipe 5 and water or steam admitted to the interior of the machine for tempering the grain. The spiral ribs 18 upon the sleeves 15 will tend to move the grain through the machine as has been previously described, and the rods 20 will tend to lift the grain and thoroughly agitate the same. The passage of the grain through the machine is retarded, however, by the action of the flanges 19 which have a tendency to move the grain in the opposite direction and thereby back the grain up against the spiral ribs 18 so as to bunch it closely together and cause the individual berries to rub against each other. It will be seen that the provision of these retarding flanges 19 very greatly increases the efficiency of the machine, since they prevent a too rapid passage of the grain through the cylindrical casings and also tend to hold the grain against the spiral ribs so that it will be bunched together and thoroughly agitated in the necessary manner. When the grain is thus bunched the rods 20 moving through the same will cause the berries to rub against each other and the slight pressure caused by the retarding action of the flanges will render this rubbing very effective for removing the short hairs and any foreign matter which may be present.

It will of course be understood that when the machine is used for scouring grain, a jet of steam or water would enter the machine with the grain through the inlet opening. It is not necessary, under some conditions, to use either the steam or the water.

Having thus described the invention, what I claim as new and desire to secure by Letters Patent, is:—

1. A grain scouring and tempering machine including a casing provided at opposite ends thereof with inlet and discharge openings respectively, a shaft extending longitudinally through the casing, means mounted upon the shaft for providing a uniform cylindrical surface extending from one end of the casing to the opposite end, spiral ribs projecting from the said cylindrical surface toward opposite ends of the casing and having the convolutions thereof extending in the same direction so as to move grain through the casing from the inlet opening to the discharge opening, longitudinally disposed rods connecting the various convolutions of each of the spiral ribs, and a comparatively short spiral rib arranged upon the cylindrical surface between the before mentioned spiral ribs and having the convolutions thereof extending in the opposite direction so as to act as a retarding member.

2. A grain scouring and tempering machine including a casing provided at opposite ends thereof with inlet and discharge openings respectively, a shaft extending through the casing, a pair of sleeves rigidly mounted upon the shaft, a collar mounted upon the shaft and held between the inner ends of the sleeves, the said collar and sleeves having the same diameter and providing a uniform cylindrical surface, spiral ribs projecting from the sleeves and having the convolutions thereof extending in the same direction so as to move grain through the casing from the inlet opening to the discharge opening, and means carried by the collar for retarding the movement of the grain through the casing.

3. A grain scouring and tempering machine including a casing provided at opposite ends thereof with inlet and discharge openings respectively, a shaft extending through the casing, a pair of sleeves mounted upon the shaft, means for locking the sleeves upon the shaft, a collar mounted upon the shaft between the inner ends of the sleeves, the collar and sleeves having the same diameter and providing a continuous and uniform cylindrical surface, spiral ribs arranged upon the respective sleeves and having the convolutions thereof extending in the same direction so as to move grain through the casing from the inlet opening to the discharge opening, longitudinally disposed rods connecting the convolutions of the respective ribs and extending through the same, and a comparatively short spiral rib carried by the collar and having the convolution thereof extending in the opposite direction so as to act as a retarding member.

In testimony whereof I affix my signature in presence of two witnesses.

CHARLES P. FOX.

Witnesses:
J. B. WAINWRIGHT,
WM. H. WARD.